United States Patent
Dabak et al.

(10) Patent No.: US 7,388,907 B2
(45) Date of Patent: Jun. 17, 2008

(54) FREQUENCY DOMAIN EQUALIZATION

(75) Inventors: Anand G. Dabak, Plano, TX (US); Eko Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/184,680

(22) Filed: Jul. 19, 2005

(65) Prior Publication Data

US 2006/0029144 A1 Feb. 9, 2006

Related U.S. Application Data (60) Provisional application No. 60/600,014, filed on Aug. 9, 2004.

(51) Int. Cl.
*H04B 1/00* (2006.01)
*H03H 7/30* (2006.01)

(52) U.S. Cl. ...................... 375/229; 375/147

(58) Field of Classification Search ............... 375/140, 375/147, 229, 230, 231
See application file for complete search history.

(56) References Cited

U.S. PATENT DOCUMENTS

| | | | | |
|---|---|---|---|---|
| 6,185,258 B1 * | 2/2001 | Alamouti et al. | ............ | 375/260 |
| 6,360,369 B1 * | 3/2002 | Mahoney | .................... | 725/111 |
| 6,912,258 B2 * | 6/2005 | Birru | .......................... | 375/340 |
| 2003/0076899 A1 * | 4/2003 | Kumar et al. | ............... | 375/316 |
| 2004/0021795 A1 * | 2/2004 | Kim | .......................... | 348/607 |
| 2004/0213339 A1 * | 10/2004 | Smee et al. | ................ | 375/232 |

* cited by examiner

*Primary Examiner*—David B Lugo
(74) *Attorney, Agent, or Firm*—Ronald O. Neerings; Wade J. Brady, III; Frederick J. Telecky, Jr.

(57) ABSTRACT

A radio receiver 102 is provided. The radio receiver 102 comprises one or more data Fast Fourier Transformers, each data Fast Fourier Transformer operable to perform a Fast Fourier Transform on an input data block, one or more impulse response Fast Fourier Transformers, each impulse response Fast Fourier Transformer operable to perform a Fast Fourier Transform on a channel impulse response, one or more multiplier components operable to multiply a term of the output of one of the data Fast Fourier Transformers by a term of the output of one of the impulse response Fast Fourier Transformers, and one or more Inverse Fast Fourier Transformers, each Inverse Fast Fourier Transformer operable to perform an Inverse Fast Fourier Transform based on an output of one or more of the multipliers.

14 Claims, 7 Drawing Sheets

FREQUENCY DOMAIN EQUALIZATION

CROSS-REFERENCE TO RELATED APPLICATIONS

This application claims priority to U.S. Provisional Application No. 60/600,014 filed Aug. 9, 2004, and entitled "Frequency Domain Equalization (FDE) for HSDPA," by Anand G. Dabak et al, incorporated herein by reference for all purposes.

FIELD OF THE INVENTION

This invention relates in general to wireless communications and more specifically, but not by way of limitation, to frequency domain equalization.

BACKGROUND OF THE INVENTION

The downlink of high speed downlink packet access (HSDPA) for third generation partnership project (3GPP) compliant systems tends to suffer from multi-path and requires the use of a chip level equalizer instead of a conventional rake receiver architecture used in communication systems such as code division multiple access (CDMA) communication systems. Chip level equalization for HSDPA is typically performed using a time domain filter computation based upon various techniques such as normalized least mean square (NLMS), 2-stage NLMS, Griffith's, pre-filter rake, channel estimation based LMS (CHEST), Fast Fourier Transform (FFT) based minimum mean squared error (MMSE) filter calculation or channel response based minimum output energy (CR-MOE).

HSDPA delivers superior speed, capacity and efficiency improvements. Some advantages to HSDPA include improved spectrum efficiency, improved network capacity, higher peak data rates, and improved allocation of resources.

SUMMARY OF THE INVENTION

A radio receiver is provided. The radio receiver comprises one or more data Fast Fourier Transformers, each data Fast Fourier Transformer operable to perform a Fast Fourier Transform on an input data block, one or more impulse response Fast Fourier Transformers, each impulse response Fast Fourier Transformer operable to perform a Fast Fourier Transform on a channel impulse response, one or more multiplier components operable to multiply a term of the output of one of the data Fast Fourier Transformers by a term of the output of one of the impulse response Fast Fourier Transformers, and one or more Inverse Fast Fourier Transformers, each Inverse Fast Fourier Transformer operable to perform an Inverse Fast Fourier Transform based on an output of one or more of the multipliers.

A method for performing frequency domain equalization on data is also provided. The method comprises (a) receiving data that needs to be demodulated, the data including a first vector $Y_1$ and a first channel impulse response, $H_1$, (b) performing Fast Fourier Transforms (FFT) on the first vector $Y_1$ and on the first channel impulse response $H_1$, (c) multiplying the data by a term of the FFTs of the first vector $Y_1$ and the first channel impulse response $H_1$, and (d) performing an Inverse FFT (IFFT) on the result of (c).

A method for performing frequency domain equalization on data is also provided. The method comprises (a) receiving a first vector $Y_1$, a first channel impulse response $H_{11}$, and a second channel impulse response $H_{21}$, (b) receiving a second vector $Y_2$, a third channel impulse response $H_{12}$, and a fourth channel impulse response $H_{22}$, (c) performing Fast Fourier Transforms (FFT) on the first vector $Y_1$, the second vector $Y_2$, the first channel impulse response $H_{11}$, the second channel impulse response $H_{21}$, the third channel impulse response $H_{12}$, and the fourth impulse response $H_{22}$, (d) determining a first product by multiplying the FFT of the first vector $Y_1$ by the FFT of the first channel impulse response $H_{11}$, a second product by multiplying the FFT of the first vector $Y_1$ by the FFT of the second channel impulse response $H_{21}$, a third product by multiplying the FFT of the second vector $Y_2$ by the FFT of the third channel impulse response $H_{12}$, and a fourth product by multiplying the FFT of the second vector $Y_2$ by the FFT of the fourth impulse response $H_{22}$, (e) determining a first sum based on summing the first, second, third, and fourth products, (f) determining a first output based on performing an Inverse FFT (IFFT) of the first sum, (g) determining a second sum based on summing the first, second, third, and fourth products, and (h) determining a second output based on performing an IFFT of the second sum.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENTS

In one embodiment of the invention, a Fast Fourier Transform (FFT) based chip level equalization is described.

The equalization does not require time domain filter computation of the chip level equalizer (CLE) as prior approaches. The equalization is performed in the frequency domain using in one illustrative example, a well-known digital signal processing (DSP) technique such as the windowing, overlap and save technique. The estimated complexity for the resulting chip level equalizer is expected to be about the same as previous FFT based chip level equalization computing time domain filters.

Figure 1:
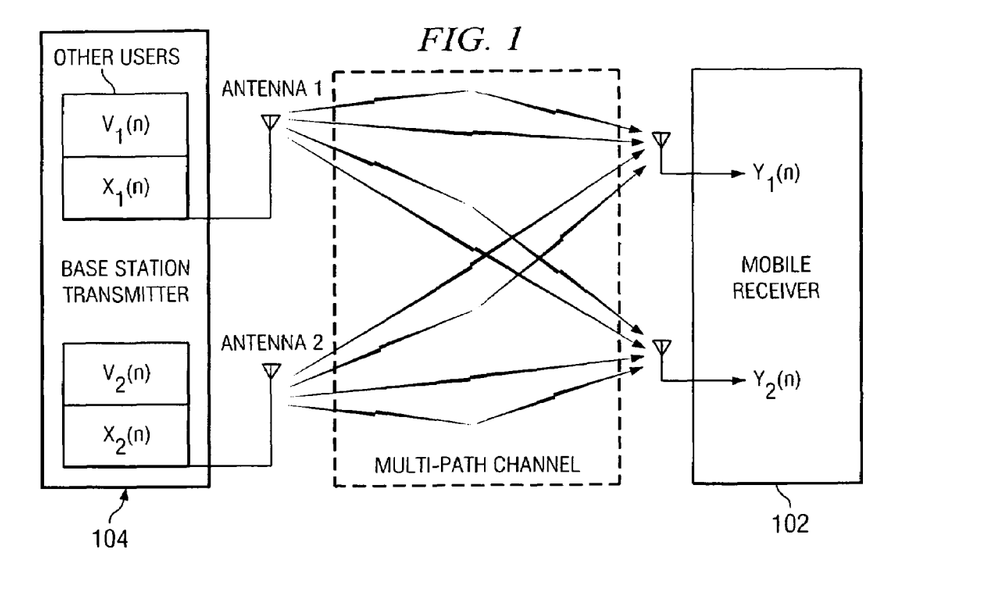
FIG. 1 is a diagram of a multiple transmit and receive antenna system for HSDPA in accordance with an embodiment of the invention.

Referring now to FIG. 1, there is shown a multiple transmit and receive antenna system for HSDPA in accordance with an embodiment of the invention. A base station 104 having two antennas is shown communicating with a mobile receiver 102 having two antennas via a multi-path channel. An FFT-based frequency domain equalization (FDE) for various antenna-setups, such as 1×1, 1×2, 2×1, 2×2 are also described in order to better understand the invention. Extension to systems with more antennas at the transmitter and/or receiver than those described is also supported by the present invention by making simple adjustments.

One Transmit and One Receive Antenna System Case

If there is only a single transmit and a single receive antenna in the HSDPA system, the channel impulse response is assumed to be given by $h^T=\{h_1, h_2, \ldots, h_N\}$. In the case of pedestrian A, pedestrian B, vehicular A channels found in reality, the various intermediate taps may be zero, but the receiver is assumed to estimate the channel for the full span for the channel response. The span of the channel response may be indicated by the 1999 release of the HSDPA modem standard and this is a long term non-real time phenomenon. The received data 202 and a block of interest for FDE 204 are shown in FIG. 2.

Figure 2:
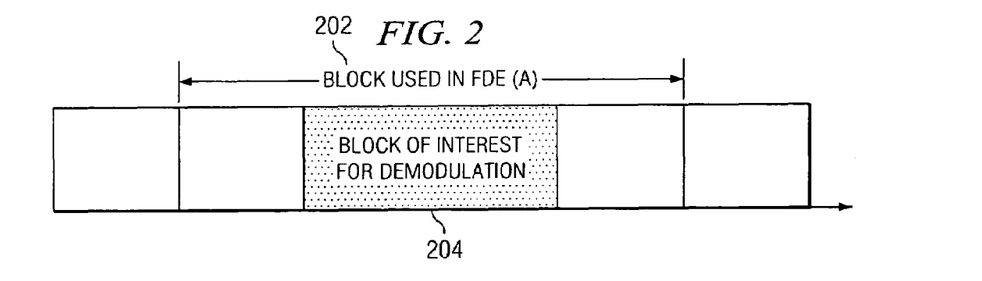
FIG. 2 shows a diagram highlighting the relationship between the block of interest and a block used in FDE in accordance with an embodiment of the invention.

As shown in FIG. 2, the block to be used in FDE is given by $Y^T=\{y_1, y_2, y_3, \ldots, y_M\}$ and and the block of interest for actual demodulation 204 is a subset of the above block Y and is given by $\bar{Y}^T=\{y_k, y_{k+1}, \ldots, y_{M-k+1}\}$ where k>0. The received data vector Y can now be written as:

$$Y = \underbrace{\begin{bmatrix} h_0 & & & & \\ h_1 & h_0 & & & \\ & h_1 & h_0 & & \\ & & h_1 & & \\ h_N & & & & \\ & h_N & & h_0 & \\ & & h_N & h_1 & h_0 \\ & & & h_2 & h_1 & h_0 \end{bmatrix}}_{H} \begin{bmatrix} x_0 \\ x_1 \\ x_2 \\ \\ \\ \\ \\ x_M \end{bmatrix} + N_{M\times 1} \quad \text{Equation (1)}$$

The channel matrix H is a Toeplitz matrix of dimension M×M. We now propose to make the matrix H circulant by copying certain terms of the channel response in the North East (top right) corner of the matrix H as given in the equation (2) below and call the resulting receive vector as $Y_{circ}$ as given in equation (3) below:

$$H_{circ} = \begin{bmatrix} h_0 & & & & & h_2 & h_1 \\ h_1 & h_0 & & & h_N & & h_2 \\ & h_1 & h_0 & & & h_N & \\ & & h_1 & & & & h_N \\ h_N & & & & & & \\ & h_N & & h_0 & & & \\ & & h_N & h_1 & h_0 & & \\ & & & h_2 & h_1 & h_0 & \end{bmatrix}, \text{ and} \quad \text{Equation (2)}$$

$$Y_{circ} = H_{circ} X + N. \quad \text{Equation (3)}$$

Since $H_{circ}$ is a circulant matrix, it can be represented as $H^{circ}=F^H \Lambda F$ where $\Lambda$ matrix and F is an FFT matrix. Using this in equation (3) the result is;

$$Y_{circ}=F^H \Lambda F X + N => F Y_{circ} = \Lambda F X + F N.$$

Since $\Lambda$ is a diagonal matrix, the MMSE solution for X can now be seen to be $$\hat{X}_{MMSE}=F^H([\Lambda^H \Lambda + \sigma^2 I])^{-1} \Lambda^H F Y_{circ}. \quad \text{Equation (4)}$$

Figure 3:
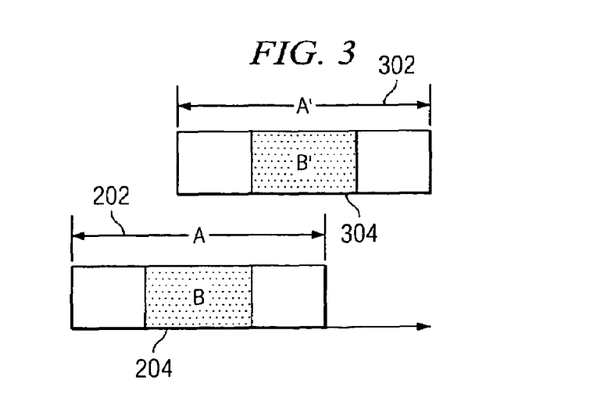
FIG. 3 shows the new blocks used in demodulation by overlapping with the previous blocks shown in FIG. 2 in accordance with an embodiment of the invention.

Since $\Lambda$ is a diagonal matrix, the matrix inverse in the above equation is a scalar inversion of the individual elements along the diagonal. The $\hat{X}_{MMSE}$ is the estimate of the transmitted signal over the whole block (A) shown in FIG. 2. Because of the approximation in equation (2) of making the matrix H being circulant, the estimates of the transmitted signal towards the edge of the block A will not be reliable. Hence, only the estimates of X for a block of data (B) shown in FIG. 2 and the remaining data from the block (A) is discarded. Next, in order to receive the remaining data in block (A) 202 the procedure is repeated where in another overlapping block A 304 is formed as shown in FIG. 3. Block 302 is the new block used in the frequency domain equalization, with 304 (B') is the new block of interest for demodulation.

Figure 4:
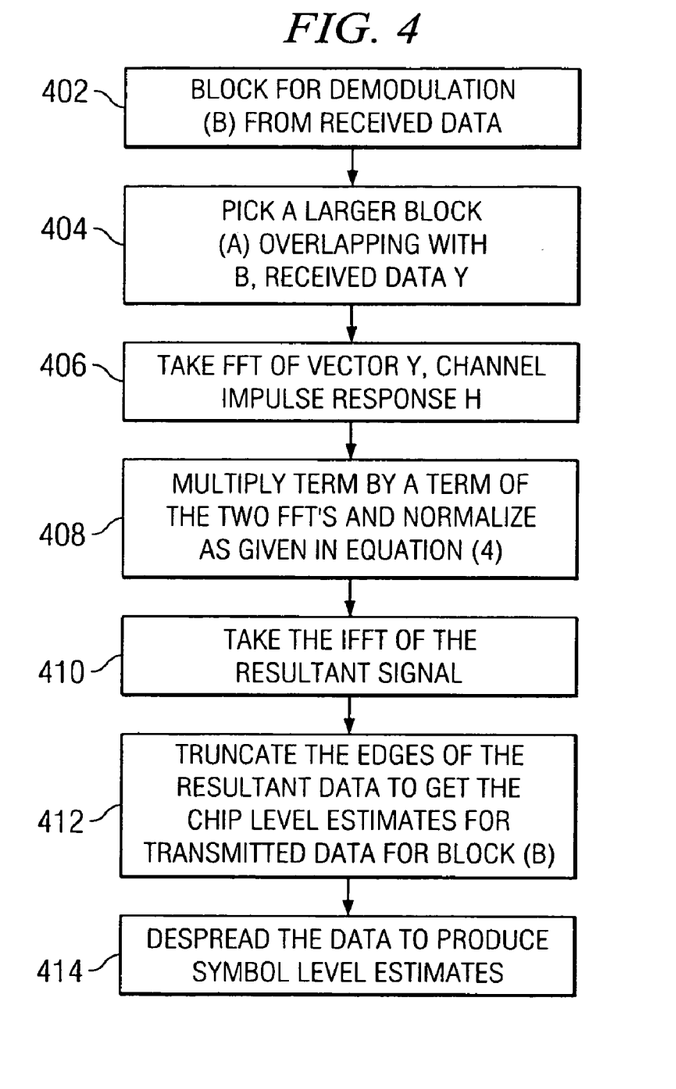
FIG. 4 shows a flowchart for performing the frequency domain equalization in accordance with an embodiment of the invention.

Referring now to FIG. 4, there is shown a flowchart highlighting the frequency domain equalization for HDSPA in accordance with one embodiment of the invention. In 402, block for demodulation (B) 204 from the received data is selected. In 404, a larger block (A) 202 is picked that overlaps (B) 204, received data Y. In 406, the FFT of vector Y and channel impulse response H are taken. In 408, the term is multiplied by the term of the two FFT's and normalized using equation (4). In 410, an inverse fast fourier transform (IFFT) of the resultant signal is computed. The edges of the resultant data are truncated in 412 in order to get the chip level estimates for the transmitted data for the block (B) 204. Finally, in 414, the data is despread in order to produce symbol level estimates. With judicious choice of equalizer parameters (e.g., the amount of overlapping, block size), it is expected that the FFT-based FDE performs at least as well as the time-domain counterparts (e.g. NLMS, Griffith, FFT-based TD-MMSE).

Figure 5:
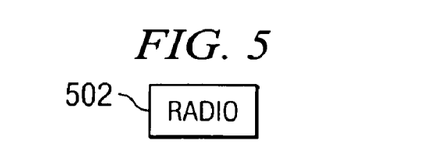
FIG. 5 shows a diagram of a radio in accordance with an embodiment of the invention.

In FIG. 5, there is shown a diagram of a radio 502 that includes a receiver that implements the FDE of the present invention. In one illustrative example, radio 502 supports HSDPA.

Complexity Estimates

Complexity estimates for the FDE for HSDPA for typical values of the lengths for blocks A, B are now described. For a length, L, the total number of complex multiplies are FFT'd if M/2 log 2(M) and M/2 log 2(M) are complex additions. The total of operations per chip is given in table 1 below, for the FDE for different chosen lengths for blocks A 202, B 204 from FIG. 2. The length of block A 202 is denoted as M, and that for block B is denoted as, P.

For comparison purposes to the present invention, consider a basic NLMS time domain equalizer with length 16 taps filter. Using the NLMS equalizer, the number of operations needed per chip are; 16 complex multiplies per chip for the filtering, plus 16 complex multiplies per chip, for the NLMS update, implying a total of at least 32 complex multiplies per chip. Similarly, the number of complex additions per chip are 15 complex adds for filtering, plus 15 complex adds for the LMS update. This implies a total of 30 complex additions per chip.

Thus, the complexity of the frequency domain based equalizer of the present invention is less than a single stage of the NLMS time domain equalizer, while achieving practically the performance of an MMSE equalizer. It should be noted that the complexity estimate for the FDE does not take the channel estimation complexity into account.

$$\begin{bmatrix} Y_{circ}^1 \\ Y_{circ}^2 \end{bmatrix}_{2M \times M} = \quad \text{Equation (7)}$$

$$\begin{bmatrix} F^H & 0 \\ 0 & F^H \end{bmatrix}_{2M \times 2M} \begin{bmatrix} \Lambda^1 \\ \Lambda^2 \end{bmatrix}_{2M \times M} F_{M \times M} X_{M \times M} + \begin{bmatrix} N^1 \\ N^2 \end{bmatrix}_{2M \times M} \Rightarrow$$

$$\begin{bmatrix} F & 0 \\ 0 & F \end{bmatrix} \begin{bmatrix} Y_{circ}^1 \\ Y_{circ}^2 \end{bmatrix}_{2M \times M} =$$

$$\begin{bmatrix} \Lambda^1 \\ \Lambda^2 \end{bmatrix}_{2M \times M} F_{M \times M} X_{M \times M} + \begin{bmatrix} N^1 \\ N^2 \end{bmatrix}_{2M \times M} \Rightarrow \hat{X}_{MMSE} =$$

$$F_{M \times M} [\Lambda^{1H} \Lambda^1 + \Lambda^{2H} \Lambda^2 + \sigma^2 I]_{M \times M}^{-1}$$

$$(\Lambda^{1H} F Y_{circ}^1 + \Lambda^{2H} F Y_{circ}^2)$$

The receiver performs a similar process to that shown in FIG. 4. In terms of complexity, looking at equation (7) one can note that the complexity for the 1×2 FDE case is less

TABLE 1

|  | M = 256, P = 128 | M = 128, P = 64 | M = 64, P = 16 | M = 32, P = 16 |
|---|---|---|---|---|
| FFT(Y) | 1024 X and + | 448 X and + | 192 X and + | 80 X and + |
| FFT(h) with zero padding | 1024 X and + | 448 X and + | 192 X and + | 80 X and + |
| Z = FFT(Y)*FFT(h) | 256 X | 128 X | 64 X | 32 X |
| z1 = z/([$\Lambda^H\Lambda + \sigma^2 I$])$^{-1}$ | 512 X, 256 + | 256 X, 128 + | 128 X, 64 + | 64 X, 32 + |
| IFFT(Z) | 1024 X and + | 448 X and + | 192 X and + | 80 X and + |
| Total | 3840 complex X, 3584 complex + | 1728 complex X, 1600 complex + | 768 complex X, 704 complex + | 304 complex X, 272 complex + |
| Operations/chip = Total/P | 30 complex X, 28 complex + | 27 complex X, 25 complex + | 48 complex X, 44 complex + | 19 complex X, 17 complex + |

FDE as a Rake Receiver

It is very important that the equalizer be able to do simple matched filtering operations and behave like a rake receiver so that the performance of the equalizer may not degrade compared to a rake receiver. In equation (4) this can be done simply by not taking the term $\Lambda^H \Lambda$ into account during the equalization phase. Thus, whenever the receiver is to be forced to behave as a rake receiver the equation becomes:

$$\hat{X}_{rake} = F^H \Lambda^H F Y_{circ}. \quad \text{Equation (5)}$$

One Transmit, Two Receive Antenna

Similar to FIG. 2, we again consider a block of interest for demodulation (B) from the two receive antennas and a larger sized block (A) for the block used in FDE. Skipping some of the obvious details, let us start by writing the equivalent equation (3) for the 1×2 antenna case;

$$\begin{bmatrix} Y_{circ}^1 \\ Y_{circ}^2 \end{bmatrix}_{2M \times M} = \begin{bmatrix} H_{circ}^1 \\ H_{circ}^2 \end{bmatrix}_{2M \times M} X_{M \times M} + \begin{bmatrix} N^1 \\ N^2 \end{bmatrix}_{2M \times M}. \quad \text{Equation (6)}$$

Where the superscripts indicate the receive antenna. In this case, once exploiting the property of circulant matrices, we get;

than twice the complexity of the single FDE since there is only one final IFFT. Hence, the expected complexity of the 1×2 FDE case is less than or comparable to a one stage NLMS, not including the channel estimation complexity for the FDE.

Two Transmit, One Receive Antenna Case

Similar to FIG. 2, a block of interest for demodulation (B) from the two receive antennas and a larger sized block (A) for the block used in FDE is considered. Starting by writing the equivalent equation (3) for the 2×1 antenna case:

$$Y_{circ} = [H_{circ}^1 \quad H_{circ}^2]_{M \times 2M} \begin{bmatrix} X^1 \\ X^2 \end{bmatrix}_{2M \times M} + N_{M \times M} \quad \text{Equation (8)}$$

Where the superscripts indicate the transmit antenna. In this case, exploiting the property of circulant matrices we get:

$$Y_{circ} = F^H [\Lambda_{circ}^1 \quad \Lambda_{circ}^2] \begin{bmatrix} F & 0 \\ 0 & F \end{bmatrix} \begin{bmatrix} X^1 \\ X^2 \end{bmatrix} + N \Rightarrow \quad \text{Equation (9)}$$

$$FY_{circ} = [\Lambda_{circ}^1 \quad \Lambda_{circ}^2] \begin{bmatrix} F & 0 \\ 0 & F \end{bmatrix} \begin{bmatrix} X^1 \\ X^2 \end{bmatrix} + FN \Rightarrow$$

For a given Y=HX+N, the MMSE equalizer is given two equivalent formulations namely; $(H^H H + \sigma^2 I)^{-1} H^H = H^H (HH^H + \sigma^2 I)^{-1}$. Now using the second formulation in equation (9) we now get:

$$\hat{X}_{MMSE} = \begin{bmatrix} F^H & 0 \\ 0 & F^H \end{bmatrix}_{2MX2M} \begin{bmatrix} \Lambda^{1H} \\ \Lambda^{2H} \end{bmatrix}_{2MXM} \quad \text{Equation (10)}$$

$$(\Lambda^1_{circ} \Lambda^{1H}_{circ} + \Lambda^2_{circ} \Lambda^{2H}_{circ} + \sigma^2 I)^{-1} FY_{circ}$$

Since the matrix inverse in the above equation is indeed a scalar inverse for each of the frequency terms, it can be interchanged with the rest of the operations. Comparing equation (10) to equation (7), it can be seen that structurally the two equations are similar, hence similar hardware architecture implementation for 1×2 and 2×1 can be used in practice. The receiver performs a similar process as shown in FIG. 4. In terms of complexity, looking at equation (10) it can be seen that the complexity for the 2×1 FDE case is less than twice the complexity of a single FDE since there is only 1 FFT. Hence, the expected complexity of the 2×1 FDE case is less than or comparable to the 1 stage NLMS case, not including the channel estimation complexity for the FDE.

Two Transmit, Two Receive Antenna Case

Similar to FIG. 2, we consider a block of interest for demodulation (B) from the two receive antennas and a larger sized block (A) for the block used in FDE. Skipping some of the basic steps, we start by writing the equivalent equation (3) for the 2×2 case:

$$\begin{bmatrix} Y^1_{circ} \\ Y^2_{circ} \end{bmatrix} = \begin{bmatrix} H^{11}_{circ} & H^{21}_{circ} \\ H^{12}_{circ} & H^{22}_{circ} \end{bmatrix}_{2MX2M} \begin{bmatrix} X^1 \\ X^2 \end{bmatrix}_{2MXM} + \begin{bmatrix} N^1 \\ N^2 \end{bmatrix}_{2MXM} \quad \text{Equation (11)}$$

where superscript ij for the channel matrix implies the channel from transmit antenna i to receive antenna j. Similarly, superscripts on Y indicate the receive antenna and the superscript on X indicates the data on the transmit antenna. Exploiting the circulant property the equation becomes:

$$\begin{bmatrix} Y^1_{circ} \\ Y^2_{circ} \end{bmatrix} = \quad \text{Equation (12)}$$

$$\begin{bmatrix} F^H & 0 \\ 0 & F^H \end{bmatrix} \begin{bmatrix} \Lambda^{11} & \Lambda^{21} \\ \Lambda^{12} & \Lambda^{22} \end{bmatrix} \begin{bmatrix} F & 0 \\ 0 & F \end{bmatrix} \begin{bmatrix} X^1 \\ X^2 \end{bmatrix}_{2MXM} + \begin{bmatrix} N^1 \\ N^2 \end{bmatrix} \Rightarrow$$

$$\begin{bmatrix} FY^1_{circ} \\ FY^2_{circ} \end{bmatrix} = \begin{bmatrix} \Lambda^{11} & \Lambda^{21} \\ \Lambda^{12} & \Lambda^{22} \end{bmatrix} \begin{bmatrix} F & 0 \\ 0 & F \end{bmatrix} \begin{bmatrix} X^1 \\ X^2 \end{bmatrix}_{2MXM} + \begin{bmatrix} N^1 \\ N^2 \end{bmatrix}$$

The above equation now looks similar to that for a 2×2 Multi-Input Multi-Output (MIMO) system. In order to better understand the above equalizer, the individual equations for the different frequency terms are written down. Let $y_{circ}^1(f)$ be the value of $FY_{circ}^1$ at frequency f. Similarly, for other terms; we then get at frequency f:

$$\begin{bmatrix} y^1_{circ}(f) \\ y^1_{circ}(f) \end{bmatrix} = \begin{bmatrix} \Lambda^{11}(f) & \Lambda^{21}(f) \\ \Lambda^{12}(f) & \Lambda^{22}(f) \end{bmatrix} \begin{bmatrix} x^1(f) \\ x^2(f) \end{bmatrix} + \begin{bmatrix} n^1(f) \\ n^2(f) \end{bmatrix}.$$

Now letting $\Delta = \begin{bmatrix} \Lambda^{11}(f) & \Lambda^{21}(f) \\ \Lambda^{12}(f) & \Lambda^{22}(f) \end{bmatrix}$ we get:

$$\begin{bmatrix} \hat{x}^1_{mmse}(f) \\ \hat{x}^2_{mmse}(f) \end{bmatrix}_{2X1} = (\Delta^H \Delta + \sigma^2 I_{2X2})^{-1}_{2X2} \Delta^H \begin{bmatrix} y^1_{circ}(f) \\ y^2_{circ}(f) \end{bmatrix}_{2X1} \quad \text{Equation (13)}$$

Once the estimates of the transmitted signal are done, at all the frequencies we obtain the $$\begin{bmatrix} \hat{X}^1_{mmse} \\ \hat{X}^2_{mmse} \end{bmatrix}$$

by taking the inverse Fourier transform of all the stacked signals from antennas 1, 2 at all the frequencies from equation (13). The receiver block diagram is now similar to that shown in FIG. 4. It may be of concern that for the 2×2 case a real 2×2 matrix inversion is needed in equation (13). However, note that for the 2×2 case, there are only a total of 8 FFT's/IFFT's needed, 2 FFT's of received data, 4 FFT's of channel and 2 IFFT's. As compared to the 1×1 antenna case where 3 FFT/IFFT's are needed. Since the 1×1 FDE complexity is less than or comparable to NLMS, it is expected that despite the 2×2 matrix inversion needed in equation (13), the complexity for 2×2 FDE will be less than or comparable to a 2×2 NLMS equalizer. The complexity of NLMS is linear in the number of transmit and receive antennas. The complexity estimates for the FDE for the 2×2 antenna case is given in Table 2 below, which provides a comparison of complexity per chip for the present invention FDE approach and an NLMS based equalization approach

TABLE 2

| | M = 32, P = 16 | Complexity for NLMS |
|---|---|---|
| FFT(Y) | 2*80 X and + | |
| FFT(h) with zero padding | 4*80 X and + | |
| Z = FFT(Y)*FFT(h) | 4*32 X | |
| z1 = ([$\Delta^H \Delta + \sigma^2 I$])$^{-1}$Z | 4*64 + 4*32 + 4*32 X, 4*64 + | |
| IFFT(Z) | 2*80 X and + | |
| Total | 1120 complex X, 736 complex + | |
| Operations/chip = Total/P (2X2 case) | 70 complex X, 46 complex + | 128 complex X, 120 complex adds |

As can be seen from Table 2, the complexity of the proposed 2×2 FDE approach is less than the 2×2 NLMS equalizer.

Figure 6:
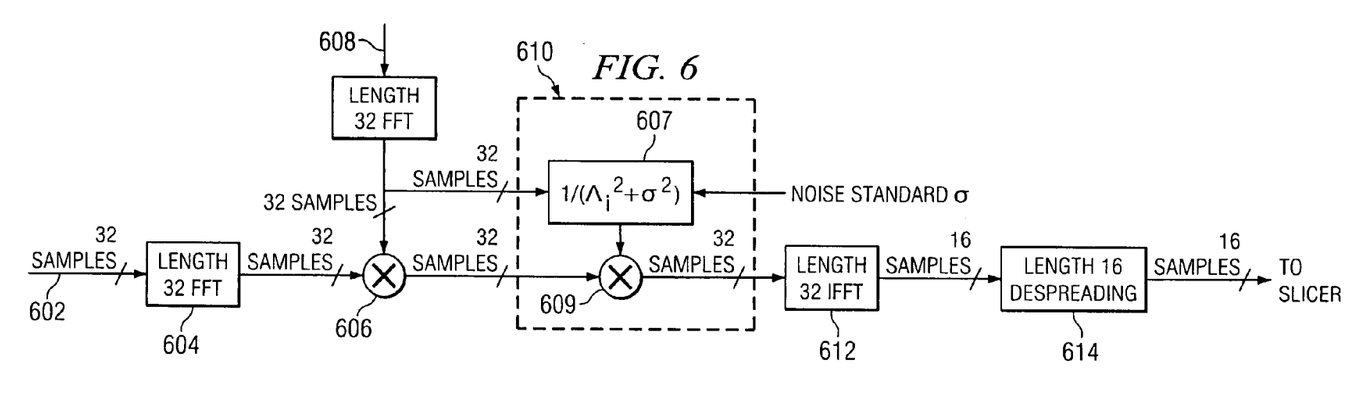
FIG. 6 shows a block diagram for a one transmit and one receive antenna system in accordance with an embodiment of the invention.

In FIG. 6 there is shown a block diagram of a FDE for a one transmit/one receive antenna system (1×1). Thirty-two samples of received chips y={$y_1, y_2, \ldots, y_{32}$} 602 are sent to a length 32 FFT 604 that provides a 32 sample output. A channel response at chip level, h={$h_1, h_2, \ldots, h_{32}$} 608 is provided to a length 32 FFT whose 32 sample output is element wise multiplied with the output of FFT 604. Block 610 is disabled if the FDE is to behave like a rake receiver, if not, a multiplier 609 multiplies the output of block 607 with the 32 samples from multiplier 606. An inverse FFT (IFFT) is performed by block 612, and a length 16 despreading is performed by block 614. The 16 sample output of the despreader 614 goes to a slicer or other similar circuitry.

Figure 7:
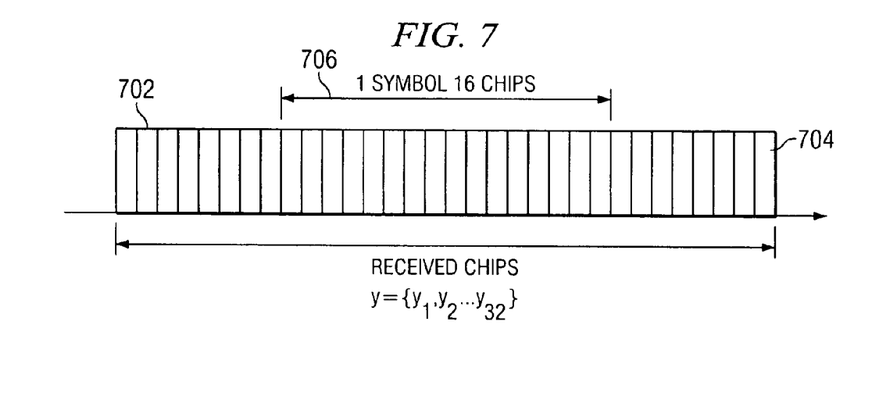
FIG. 7 shows a diagram of the data used at the despreader input in accordance with an embodiment of the invention.

Referring now to FIG. 7, there is shown the data 706 used at the input to despreader 614, the data along the ends 702 and 704 is discarded at the output of the IFFT 612 and is not sent to the despeader 614.

Figure 8:
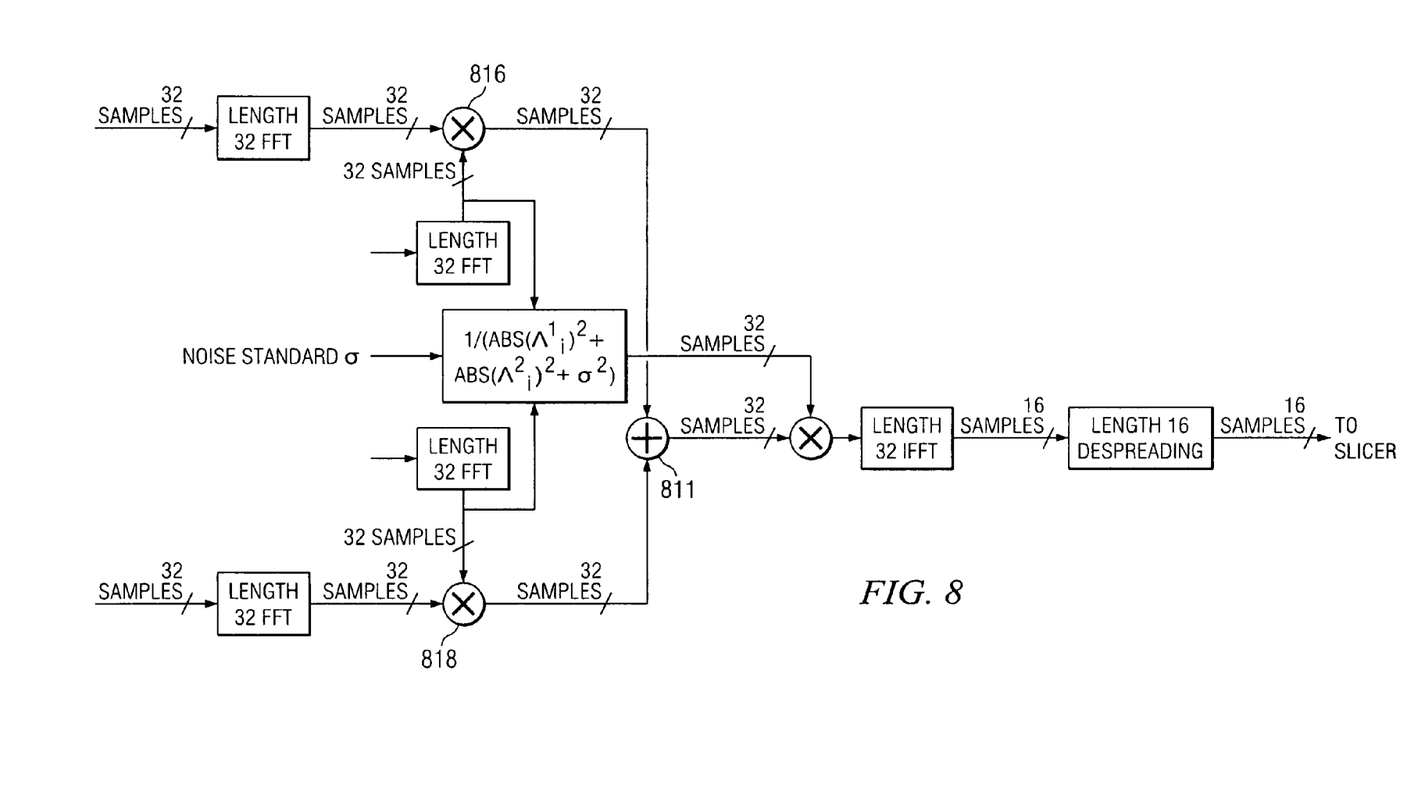
FIG. 8 shows a diagram of a frequency domain equalizer for a one transmit/two receive antenna system in accordance with an embodiment of the invention.

In FIG. 8 there is shown a block diagram of a FDE for a one transmit/two receive antenna system (1×2). The receiver depicted in FIG. 8 is substantially similar to that depicted in FIG. 6, and the signal received by each of the two antennas is processed similarly to that described with reference to FIG. 6, with the provision that the output of a first multiplier 816 and a second multiplier 818 is summed by a summing component 811.

Figure 9:
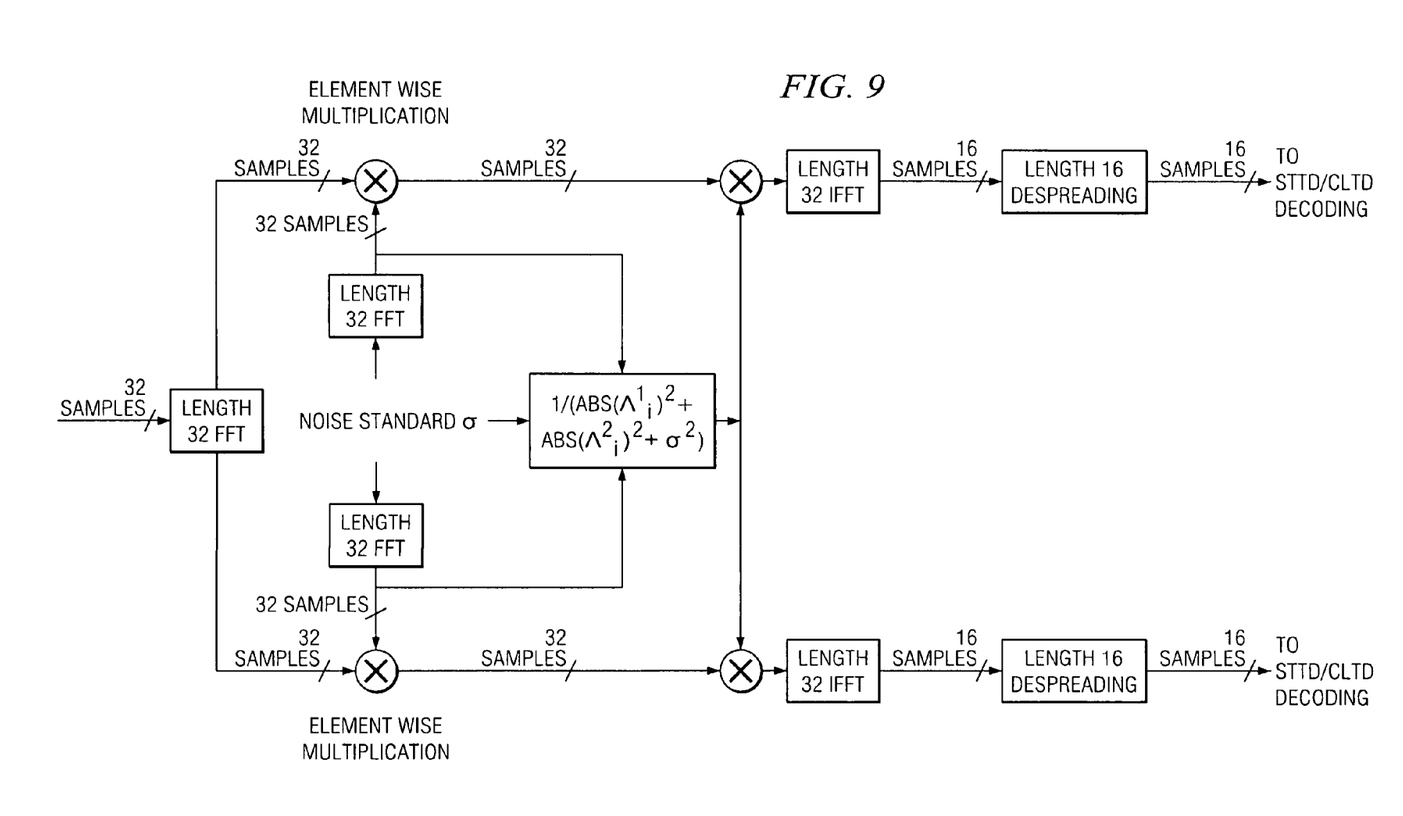
FIG. 9 shows a diagram for a frequency domain equalizer for a two transmit/one receive antenna system in accordance with an embodiment of the invention.

In FIG. 9 there is shown a block diagram of a FDE for a two transmit/one receive antenna system (2×1). The receiver depicted in FIG. 9 is substantially similar to that depicted in FIG. 6, and the signal received by the one antenna is processed similarly to that described with reference to FIG. 6, with the provision that the input y is processed by similar receiver stages each provisioned with an appropriate channel response.

Figure 10:
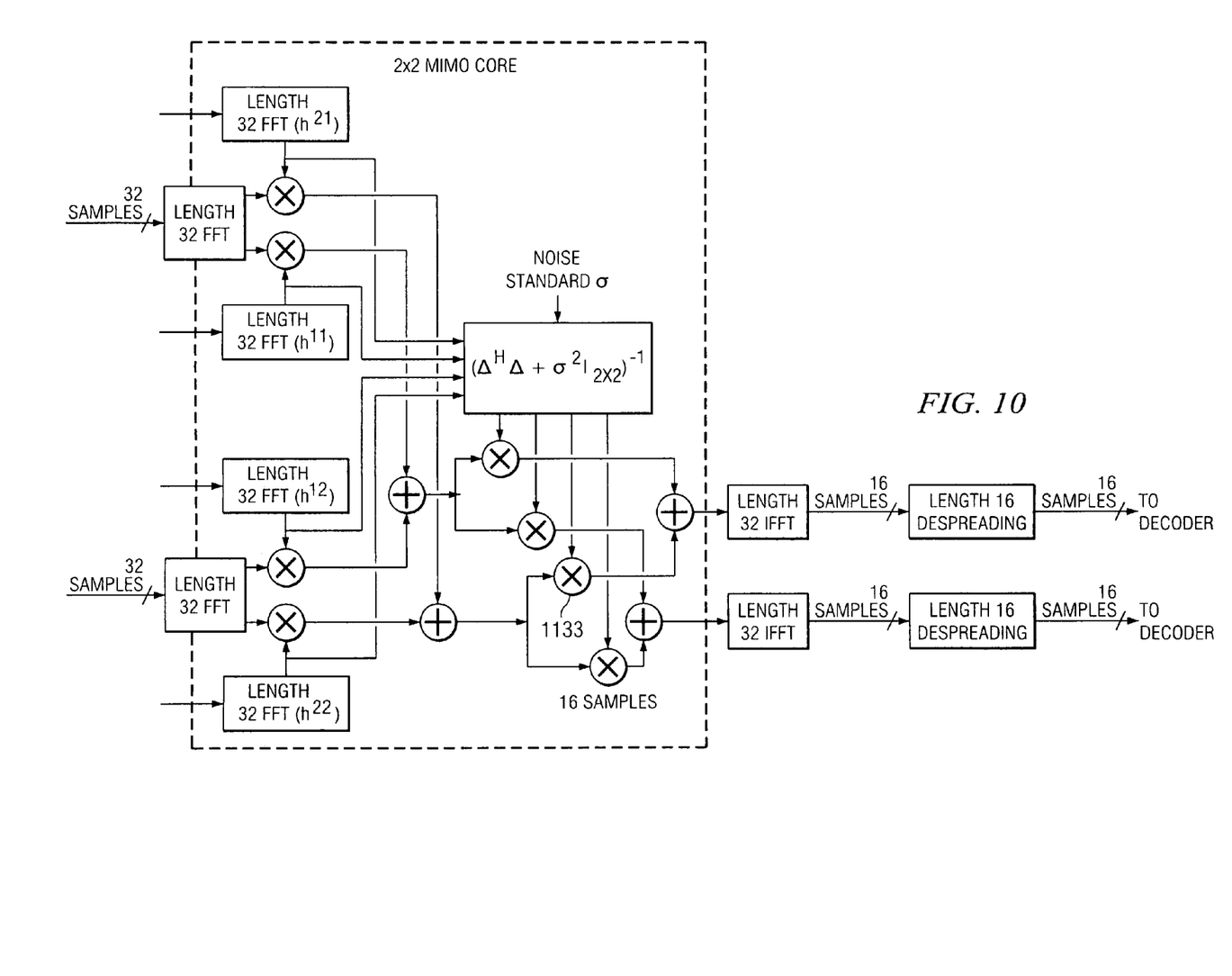
FIG. 10 shows a diagram for a frequency domain equalizer for a two transmit/two receive antenna system in accordance with an embodiment of the invention.

In FIG. 10 there is shown a block diagram of a FDE for a two transmit/two receive antenna system (2×2). The receiver depicted in FIG. 8 is substantially similar to that depicted in FIG. 6 and combines one or more aspects of the processing depicted in FIG. 8 and FIG.

Figure 11:
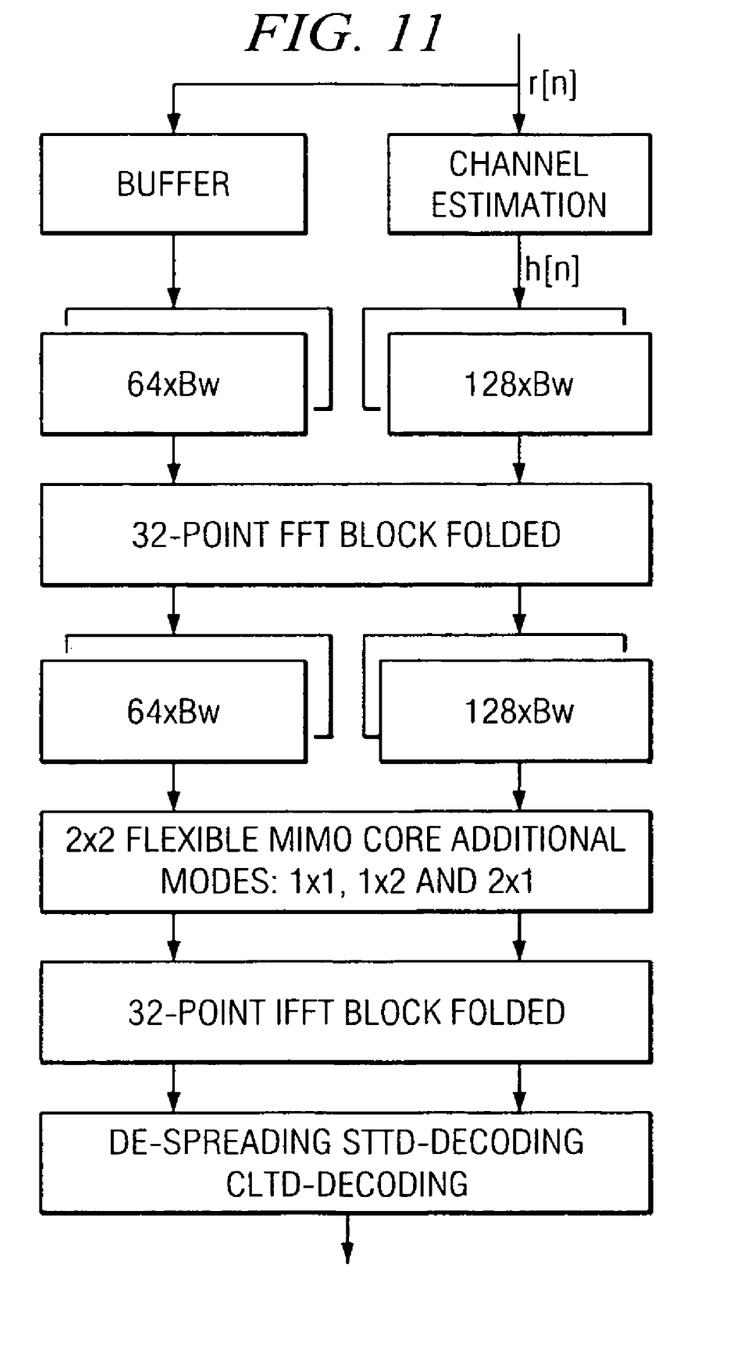
FIG. 11 shows a block diagram of a frequency domain equalizer architecture in accordance with an embodiment of the invention.

In FIG. 11 there is shown a block diagram of a frequency domain equalizer architecture accordance with another embodiment.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A method for performing frequency domain equalization on data, comprising:
   (a) receiving data that needs to be demodulated, the data including a first vector $Y_1$ and a first channel impulse response, $H_1$;
   (b) performing Fast Fourier Transforms (FFT) on the first vector $Y_1$ and on the first channel impulse response $H_1$;
   (c) multiplying the output of the FFTs of the first vector $Y_1$ and the first channel impulse response $H_1$;
   (d) performing an Inverse FFT (IFFT) on the result of (c);
   (e) truncating portions of data resulting from (d) in order to get chip level estimates; and
   (f) despreading the truncated data in order to produce symbol level estimates.

2. The method of claim 1, wherein the frequency domain equalization is performed on an extended block of data that is larger than the data that needs to be demodulated.

3. The method of claim 2, wherein further received data is frequency domain equalized by selecting other extended blocks of data that overlap with the extended block of data.

4. A method for performing frequency domain equalization on data, comprising:
   (a) receiving data that needs to be demodulated, the data including a first vector $Y_1$ and a first channel impulse response, $H_1$;
   (b) performing Fast Fourier Transforms (FFT) on the first vector $Y_1$ and on the first channel impulse response $H_1$;
   (c) multiplying the output of the FFTs of the first vector $Y_1$ and the first channel impulse response $H_1$;
   (d) performing an Inverse FFT (IFFT) on the result of (c);
   (e) receiving a second channel impulse response $H_2$;
   (f) performing a FFT on the second channel impulse response $H_2$;
   (g) multiplying the output of the FFTs of the first vector $Y_1$ and the second channel impulse response $H_2$; and
   (h) performing an IFFT on the result of (g).

5. A method for performing frequency domain equalization on data, comprising:
   (a) receiving data that needs to be demodulated, the data including a first vector $Y_1$ and a first channel impulse response, $H_1$;
   (b) performing Fast Fourier Transforms (FFT) on the first vector $Y_1$ and on the first channel impulse response $H_1$;
   (c) multiplying the output of the FFTs of the first vector $Y_1$ and the first channel impulse response $H_1$;
   (d) performing an Inverse FFT (IFFT) on the result of (c);
   (e) truncating portions of data resulting from (d) in order to get chip level estimates;
   (f) despreading the truncated data in order to produce symbol level estimates;
   (g) receiving a second channel impulse response $H_2$;
   (h) performing a FFT on the second channel impulse response $H_2$;
   (i) multiplying the output of the FFTs of the first vector $Y_1$ and the second channel impulse response $H_2$; and
   (k) performing an IFFT on the result of (j).

6. A method for performing frequency domain equalization on data, comprising:
   (a) receiving data that needs to be demodulated, the data including a first vector $Y_1$ and a first channel impulse response, $H_1$;
   (b) performing Fast Fourier Transforms (FFT) on the first vector $Y_1$ and on the first channel impulse response $H_1$;
   (c) multiplying the output of the FFTs of the first vector $Y_1$ and the first channel impulse response $H_1$;
   (d) performing an Inverse FFT (IFFT) on the result of (c);
   (e) receiving a second vector $Y_2$ and a second channel impulse response $H_2$;
   (f) performing a FFT on the second vector $Y_2$ and on the second channel impulse response $H_2$;
   (g) multiplying a term of the FFT of the second vector $Y_2$ by a term of the second channel impulse response $H_2$; and
   (h) summing the result of (g) with the result of (c) before performing the IFFT of (d).

7. A radio receiver, comprising:
   one or more data Fast Fourier Transformers, each data Fast Fourier Transformer operable to perform a Fast Fourier Transform on an input data block;
   one or more impulse response Fast Fourier Transformers, each impulse response Fast Fourier Transformer operable to perform a Fast Fourier Transform on a channel impulse response;
   one or more multiplier components operable to multiply the output of one of the data Fast Fourier Transformers by the output of one of the impulse response Fast Fourier Transformers; and
   one or more Inverse Fast Fourier Transformers; each Inverse Fast Fourier Transformer operable to perform an Inverse Fast Fourier Transform based on an output of one or more of the multipliers;
   wherein two data Fast Fourier Transformers, two impulse response Fast Fourier Transformers, two multiplier components, and one Inverse Fast Fourier Transformer are employed and further including a summation component operable to sum the output of the two multiplier components and provide the output to the Inverse Fast Fourier Transformer.

8. A radio receiver, comprising:
one or more data Fast Fourier Transformers, each data Fast Fourier Transformer operable to perform a Fast Fourier Transform on an input data block;
one or more impulse response Fast Fourier Transformers, each impulse response Fast Fourier Transformer operable to perform a Fast Fourier Transform on a channel impulse response;
one or more multiplier components operable to multiply the output of one of the data Fast Fourier Transformers by the output of one of the impulse response Fast Fourier Transformers; and
one or more Inverse Fast Fourier Transformers, each Inverse Fast Fourier Transformer operable to perform an Inverse Fast Fourier Transform based on an output of one or more of the multipliers;
wherein one data Fast Fourier Transformer, two impulse response Fast Fourier Transformers, two multiplier components, and two Inverse Fast Fourier Transformers are employed.

9. A radio receiver, comprising:
one or more data Fast Fourier Transformers, each data Fast Fourier Transformer operable to perform a Fast Fourier Transform on an input data block;
one or more impulse response Fast Fourier Transformers, each impulse response Fast Fourier Transformer operable to perform a Fast Fourier Transform on a channel impulse response;
one or more multiplier components operable to multiply the output of one of the data Fast Fourier Transformers by the output of one of the impulse response Fast Fourier Transformers; and
one or more Inverse Fast Fourier Transformers, each Inverse Fast Fourier Transformer operable to perform an Inverse Fast Fourier Transform based on an output of one or more of the multipliers;
wherein two data Fast Fourier Transformers, four impulse response Fast Fourier Transformers, four multiplier components, and two Inverse Fast Fourier Transformers are employed.

10. The radio receiver of claim 9, further comprising means for truncating the edges of the output of one or more of the IFFTs to determine chip level estimates.

11. The radio receiver of claim 10, further comprising one or more despreaders operable to despread an output of one of the Inverse Fast Fourier Transformers to produce symbol level estimates.

12. A method for performing frequency domain equalization on data, comprising:
(a) receiving a first vector $Y_1$, a first channel impulse response $H_{11}$, and a second channel impulse response $H_{21}$;
(b) receiving a second vector $Y_2$, a third channel impulse response $H_{12}$, and a fourth channel impulse response $H_{22}$;
(c) performing Fast Fourier Transforms (FFT) on the first vector $Y_1$, the second vector $Y_2$, the first channel impulse response $H_{11}$, the second channel impulse response $H_{21}$, the third channel impulse response $H_{12}$, and the fourth impulse response $H_{22}$;
(d) determining a first product by multiplying the FFT of the first vector $Y_1$ by the FFT of the first channel impulse response $H_{11}$, a second product by multiplying the FFT of the first vector $Y_1$ by the FFT of the second channel impulse response $H_{21}$, a third product by multiplying the FFT of the second vector $Y_2$ by the FFT of the third channel impulse response $H_{12}$, and a fourth product by multiplying the FFT of the second vector $Y_2$ by the FFT of the fourth impulse response $H_{22}$; and
(e) determining a first sum based on summing the first, second, third, and fourth products;
(f) determining a first output based on performing an Inverse FFT (IFFT) of the first sum;
(g) determining a second sum based on summing the first, second, third, and fourth products; and
(h) determining a second output based on performing an IFFT of the second sum.

13. The method of claim 12, further comprising:
(j) truncating portions of the first output and truncating portions of the second output.

14. The method of claim 13, further comprising:
(k) despreading the first output and the second output in order to produce a first symbol level estimate and a second symbol level estimate.

* * * * *